United States Patent [19]
Kitlas et al.

[11] Patent Number: 5,852,547
[45] Date of Patent: Dec. 22, 1998

[54] MODULE SHROUD ATTACHMENT TO MOTHERBOARD

[75] Inventors: Ken Kitlas, San Jose; Khim Foo, Palo Alto, both of Calif.

[73] Assignee: Sun Microsystems, Inc., Mountain View, Calif.

[21] Appl. No.: 892,504

[22] Filed: Jul. 14, 1997

[51] Int. Cl.⁶ ................................... H05K 7/20
[52] U.S. Cl. ........................................... 361/695
[58] Field of Search ................... 361/687–688, 361/690, 694–695, 715

[56] References Cited

U.S. PATENT DOCUMENTS

| | | | |
|---|---|---|---|
| 5,136,465 | 8/1992 | Bench et al. | 361/687 |
| 5,159,528 | 10/1992 | Murphy | 361/687 |
| 5,338,214 | 8/1994 | Steffer et al. | 361/687 |
| 5,497,288 | 3/1996 | Otit et al. | 361/687 |
| 5,523,917 | 6/1996 | Searby | 361/687 |
| 5,562,410 | 10/1996 | Sach et al. | 361/695 |

*Primary Examiner*—Gregory Thompson
*Attorney, Agent, or Firm*—Flehr Hohbach Test Albritton Herbert

[57] ABSTRACT

A shroud attachment (10) for positioning a CPU module (14) relative to a cooling fan (12) on a motherboard (18) and within a computer chassis (24). Shroud (10) includes a vented cooling fan enclosure (11), a CPU mounting section (13), a swing clip (60), fastener mounts (63, 65) for holding captive fasteners (20, 22), which secure motherboard (18) to chassis (24) and provide electrical ground points. Side rails (56, 58) capture side edges of CPU module (14), which includes an enclosure housing (16) for directing cooling air flow past the CPU.

17 Claims, 7 Drawing Sheets

MODULE SHROUD ATTACHMENT TO MOTHERBOARD

TECHNICAL FIELD

The present invention pertains to computer hardware components and, more particularly, to a mounting assembly for securing a CPU in position relative to a cooling fan within a computer chassis.

BACKGROUND ART

As computer microprocessors or central processing units (CPU's) increase in speed, the need for more efficient cooling of the CPU increases as well. Computer fans for cooling CPU's are generally positioned at the exterior of the computer chassis and in proximity to the CPU so that air drawn out of the chassis passes across the CPU and any associated cooling fins. While the limits of microprocessor speeds are pushed further and fuller and more heat is generated internally, the ability to control air flow past CPU's is limited by conventional cooling system designs, including fan design, computer chassis size, internal hardware designs, and noise considerations. Thus, maximum use needs to be made of the limited space provided within computer housings, in order to provide sufficient cooling for increasingly faster CPU's.

DISCLOSURE OF INVENTION

Briefly described, the shroud assembly of the present invention positions a CPU relative to a cooling fan within a computer chassis and includes a vented cooling fan enclosure for securing the cooling fan in position on the motherboard.

The cooling fan enclosure includes at least one vent for drawing air past the CPU to the exterior of the computer chassis. The shroud assembly also includes a CPU mount for positioning the CPU relative to the cooling fan, and a CPU housing for enclosing the CPU. The CPU housing forms an air inlet opening and an air outlet opening that aligns with the vent in the cooling fan enclosure. The CPU mount also includes means for detachably aligning the CPU housing in a manner wherein its air outlet opening aligns with the vent of the cooling fan enclosure, so that air drawn by the cooling fan flows into the air inlet of the CPU module housing, across the CPU, out the air outlet opening and into the cooling fan enclosure, to be forced out of the computer chassis.

The present invention also comprises a computer that includes a computer chassis, a CPU, a housing enclosing the CPU that includes an inlet opening and an outlet opening, a motherboard on which the CPU is mounted, a cooling fan for drawing air across the CPU, and a shroud attachment for positioning the CPU relative to the cooling fan. The shroud attachment includes a fan enclosure for mounting the cooling fan. The enclosure includes an inlet opening that aligns with the outlet opening of the CPU housing, so that air drawn across the CPU enters the fan enclosure and is vented to the exterior of the chassis.

According to an aspect of the invention, the computer also includes an auxiliary fan for cooling different electrical components of the computer. The shroud is dimensioned to create a partition within the chassis to isolate cooling air flows of the first cooling fan and the auxiliary fan. The auxiliary fan is housed in a compartment, which along with the shroud, divides the interior of the chassis into two distinct cooling areas. According to another aspect of the invention, the shroud includes fasteners for grounding the motherboard to the chassis. The fasteners provide electrical ground connections to the computer chassis, which is otherwise held within the chassis but not grounded. Preferably, the fasteners extend from the shroud, down throw the motherboard, and into the chassis.

It is an important advantage of the present invention to provide for separate cooling air flows within the chassis. The cooling requirements of the PCI cards vary from that of the CPU module. And in order to achieve precise cooling efficiency, it is desirable to maximize the cooling ability of internal convective air flow patterns. Thus, a housing is provided for directing cooling air across the CPU and isolated compartments within the chassis allow for different cooling capacity for different parts of the system.

The shroud attachment of the present invention is a multipurpose component in that it positions the CPU module relative to a cooling fan, provides mounts for captive fasteners, which secure and electrically ground the motherboard, and creates a partition for isolating separate cooling air flows within the chassis. This combined, functional design of the shroud attachment simplifies the internal hardware design of the computer while enhancing cooling efficiency.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
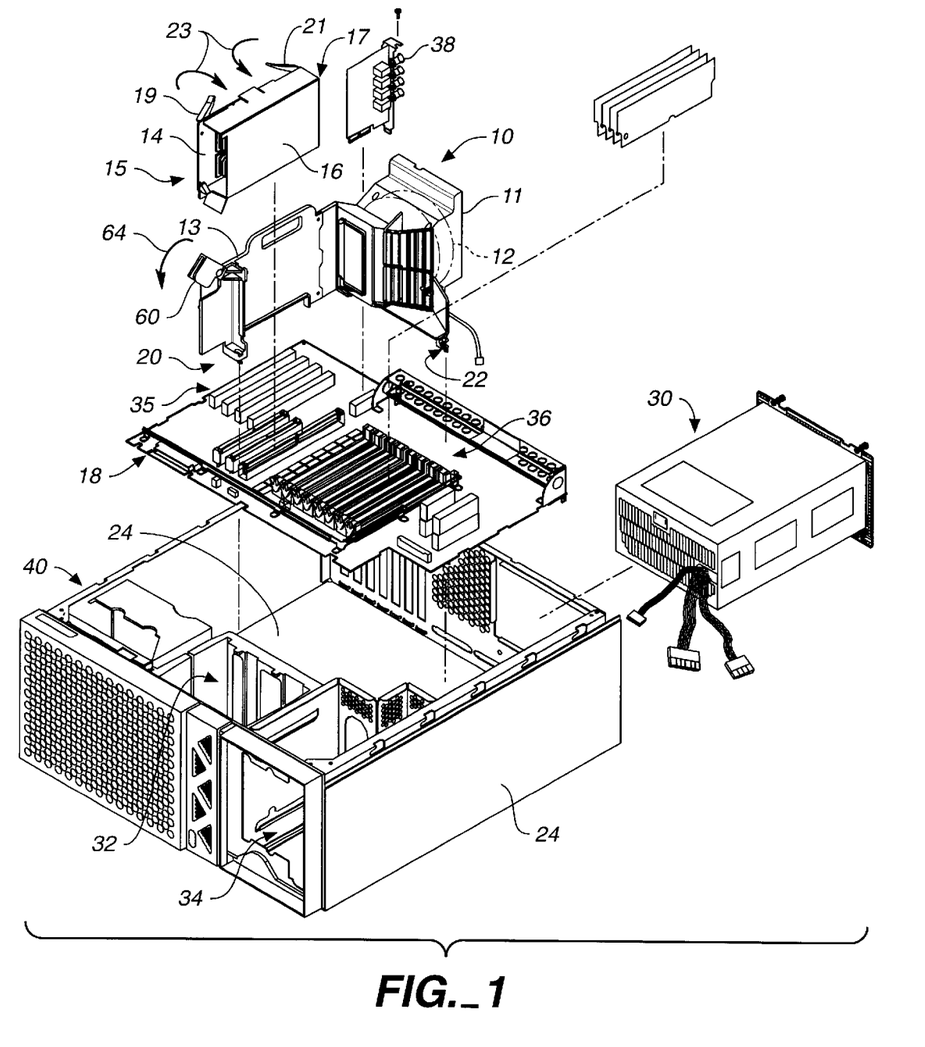
FIG. 1 is an exploded view of a computer assembly showing the shroud attachment that positions the CPU module relative to the fan.

Referring to FIG. 1, the module shroud attachment of the present invention is designated by reference numeral 10. Shroud 10 includes a vented cooling fan enclosure 11 in which a cooling fan 12 is mounted and a CPU front panel mount section 13, which positions a CPU module 14 relative to cooling fan 12. CPU module 14 includes a rectangular enclosure housing 16, in which is mounted a CPU and associated cooling fins (not shown). Housing 16 encloses the CPU and defines an inlet opening 15 and an outlet opening 17. Cooling air is drawn through inlet opening 15, across the cooling fins of the CPU, out the outlet opening 17 and into cooling fan enclosure 11. CPU module 14 also includes a pair of cam-action clips 19, 21, which clip onto front panel mount section 13, in a vertical plane as shown and indicated by arrows 23, and hold the CPU module down onto the shroud 10.

Shroud 10 is secured to the motherboard 18 in a manner discussed with reference to FIGS. 4, 5 and 6. A pair of captive fasteners 20, 22 are carried by shroud 10 and extend down through motherboard 18 and secure shroud 10 to chassis 24, thereby providing ground points for the motherboard. Motherboard 18 is positioned within chassis 24 by conventional slot means. Captive fasteners 20, 22, in addition to grounding motherboard 18, secure the motherboard to the chassis and thereby prevent lateral movement of the motherboard, lateral being defined as sideways movement when computer chassis 24 is oriented upright as a mini-tower enclosure.

Additional computer components shown in FIG. 1 are conventional and individually form no part of the present invention. These include power supply 30, drive bay 32, peripheral bay 34, PCI card slots 35, DSIMM Slots 36, audio card 38, and auxiliary fan compartment 40.

Figure 2:
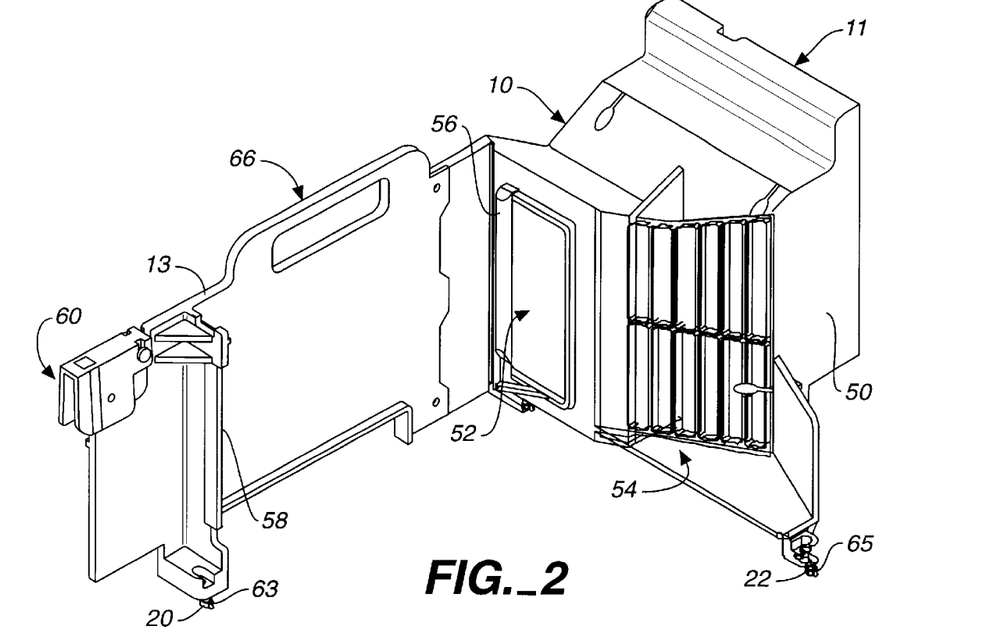
FIG. 2 is an enlarged pictorial view of the shroud attachment.
Figure 3:
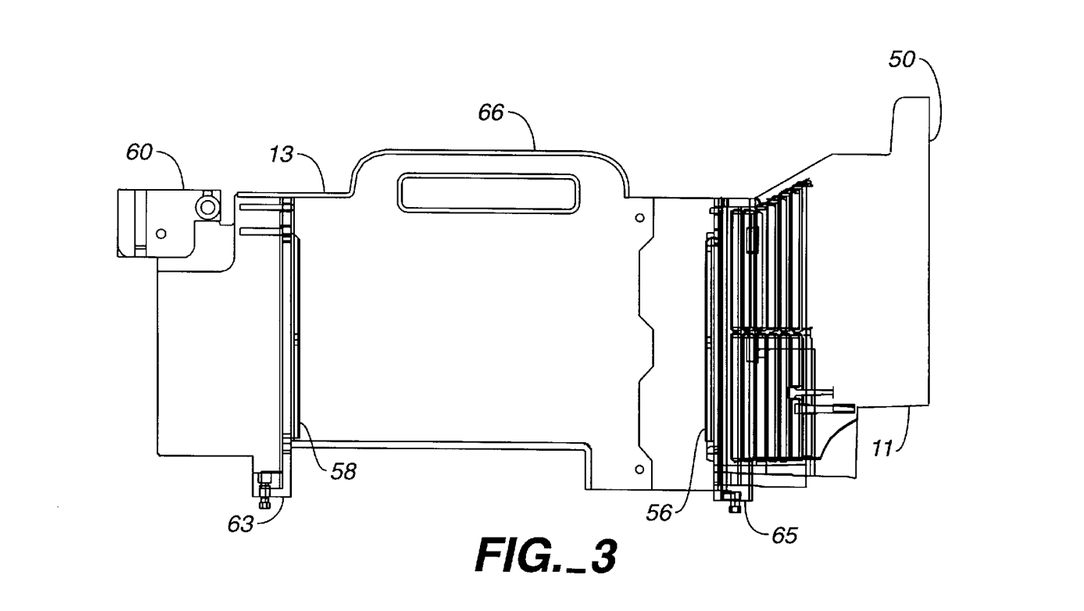
FIG. 3 is a side elevation view of the shroud attachment.

Referring to FIG. 2, shroud 10 can be seen to somewhat of an L-shaped component with a large foot compartment that is the vented cooling fan enclosure 11. The vented cooling fan enclosure 11 includes an outlet side 50 through which the cooling fan blows exhaust air to the exterior of chassis 24. Cooling fan enclosure 11 also includes a large, rectangular rear inlet opening 52, which receives air drawn across the CPU module housing, and additional slotted vents 54, which allow for air to be drawn from areas of the motherboard 18 in and around the DSIMMS.

The front panel CPU mount 13 of shroud 10 forms the long leg of shroud 10 and includes a pair of opposed rails 56, 58, which are designed to capture side edges of CPU module housing 16 and thereby position the housing relative to the shroud. When captured by opposed rails 56, 58, CPU housing 16 is positioned with its outlet opening 17 aligned with the inlet opening 52 of cooling fan enclosure 11. The CPU plugs into a slot on the motherboard and is secured by the slot. Rails 56, 58 serve primarily to align the CPU module so that it stays fully plugged into the CPU slot on the motherboard and is properly positioned relative to the cooling fan.

Shroud 10 also includes a swing clip 60, which is pivotally mounted at one end of the shroud, opposite cooling fan enclosure 11. Swing clip 60 includes a slot for receiving the edge of a fixed position flange, when the swing clip is pivoted in the direction of arrow 64 of FIG. 1 to the position of FIG. 2. Swing clip 60 and its cooperating flange are discussed in more detail with reference to FIGS. 6, 8 and 9.

The captive fasteners 20, 22 are secured to shroud 10 at fasteners mounts 63, 65, which extend down from shroud 10 and engage the motherboard and align with openings therein for the fasteners to extend through to the chassis. The CPU mount section 13 of shroud 10 also includes a handle grip 66, which allows shroud 10 to be easy grabbed and removed from the motherboard when interference hooks, discussed later, and the captive fasteners are released.

Figure 4:
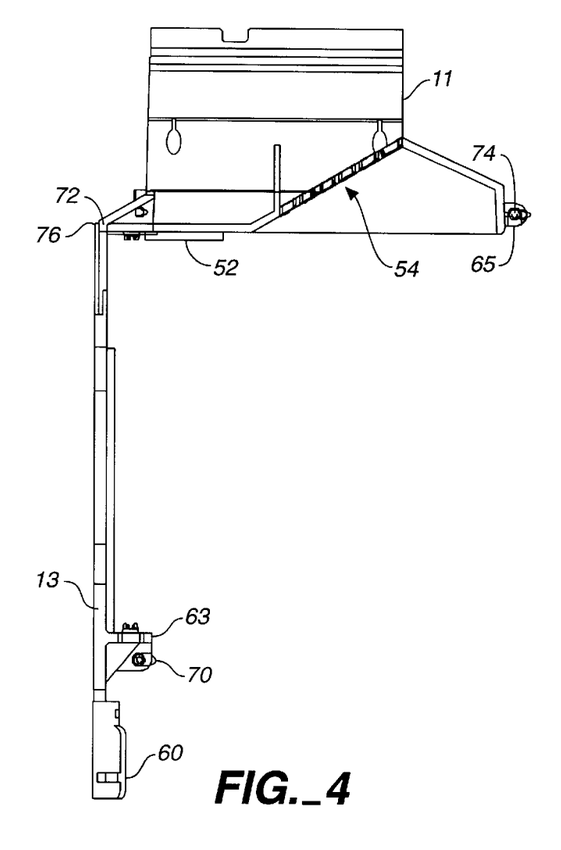
FIG. 4 is a top plan view of the shroud attachment.
Figure 5:
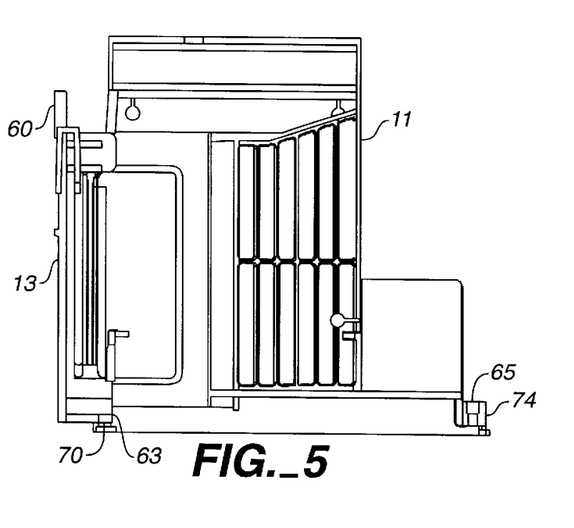
FIG. 5 is an end elevation view of the shroud attachment.

Referring to FIGS. 4 and 5, three interference hooks 70, 72, 74 are mounted to shroud 10, one at the swing clip end underneath fastener mount 63 and adjacent captive fastener 20, another at the corner 76 of shroud 10, and the third at the vented enclosure end adjacent fastener mount 65. Interference hooks 70, 72, 74 are L-shaped projections from shroud 10 that fit through keyhole openings in the motherboard and grab an edge of the openings as the shroud is shifted sideways, to lock the shroud onto the motherboard. Hooks 70, 72, 74 prevent outward movement of the shroud away from the motherboard. The interference hooks 70, 72, 74 can be easily released from the motherboard by sliding the shroud sideways, which releases the interfering legs of the hooks from the edges of the keyhole openings, allowing shroud 10 to be removed from the motherboard, upon release of the captive fasteners as well.

Figure 6:
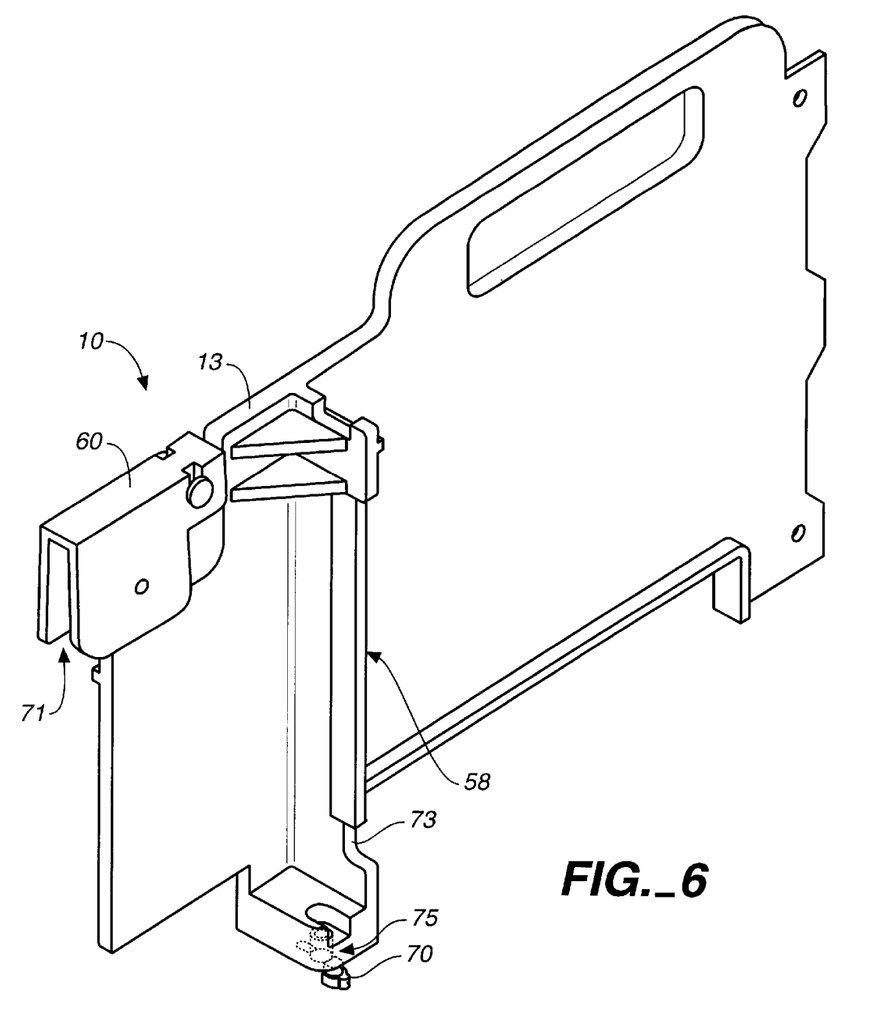
FIG. 6 is an enlarged pictorial view of the swing clip end of the shroud attachment.

Referring to FIG. 6, a detailed view of the swing clip end of shroud 10 is shown. Swing clip 60 includes a slot 71, which fits over a flange edge or other flat edge part of the chassis and thereby secures the upper edge of shroud 10 in position.

Swing clip 60 supplements the positioning of the CPU module that is provided by rails 56, 58 and by the CPU connector itself. Rail 58 is formed by bracket portion 73 of shroud 10. The bottom portion of bracket 73 defines a captive housing 75 for one of the captive fasteners (not shown). Interference hook 70 extends down and outwardly from the bottom of bracket 73.

Figure 7:
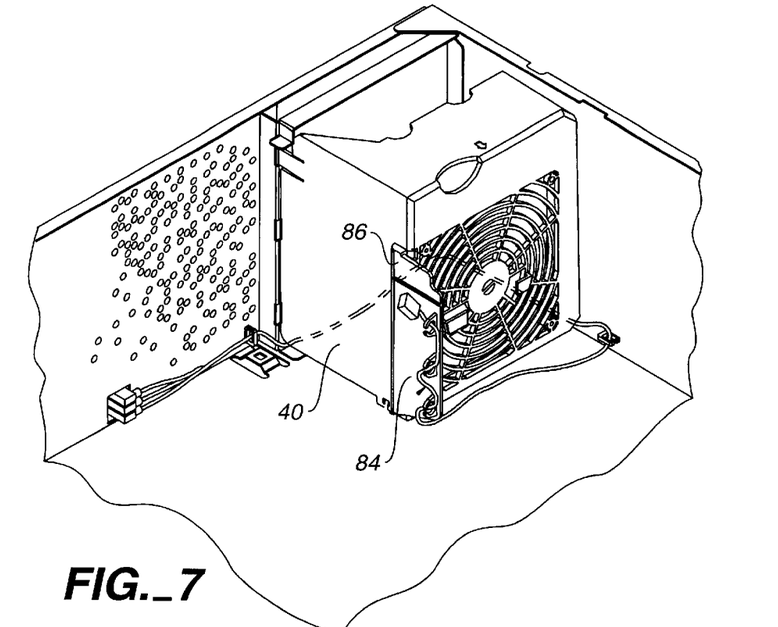
FIG. 7 is a pictorial view of an adjacent PCI cards compartment that includes a positioning flange for aligning the shroud attachment.

Referring to FIG. 7, the auxiliary fan compartment 40 is formed by a box-like enclosure in which is mounted an auxiliary fan (not shown). The auxiliary fan provides cooling air flow to the PCI card slots that are positioned on the side of shroud 10 opposite the CPU module. In this manner, shroud 10 functions as an air flow divider, separating cooling air for the CPU module from the cooling air for the PCI card slots. This is discussed in more detail with reference to FIG. 10. A forwardly extending upright flange 84 is provided at the inside corner of compartment 40 and is fixedly mounted thereto. The swing clip 60 of the shroud pivots downwardly (or sideways if chassis 24 is upright) onto and straddles the upper edge 86 of flange 84. Flange 84 provides a fixed point at which to secure one end of the shroud, thereby securing the shroud in position on the motherboard, but also aligning the CPU module housing with cooling fan 12.

Figure 8:
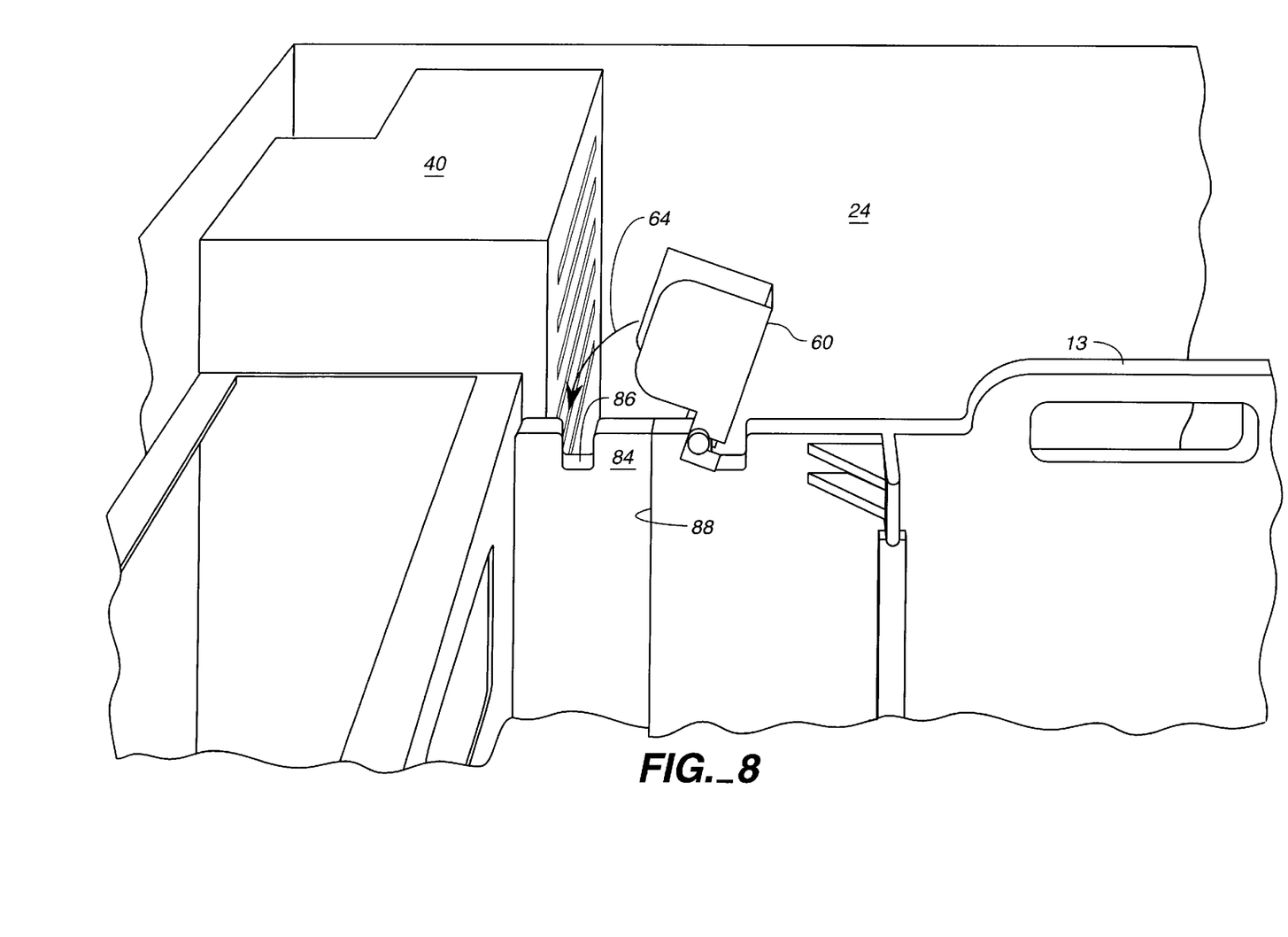
FIGS. 8 and 9 are pictorial views of the swing clip that clips onto the positioning flange of FIG. 7, one view showing the swing clip in an open position and the other showing the swing clip in a locked position.
Figure 9:
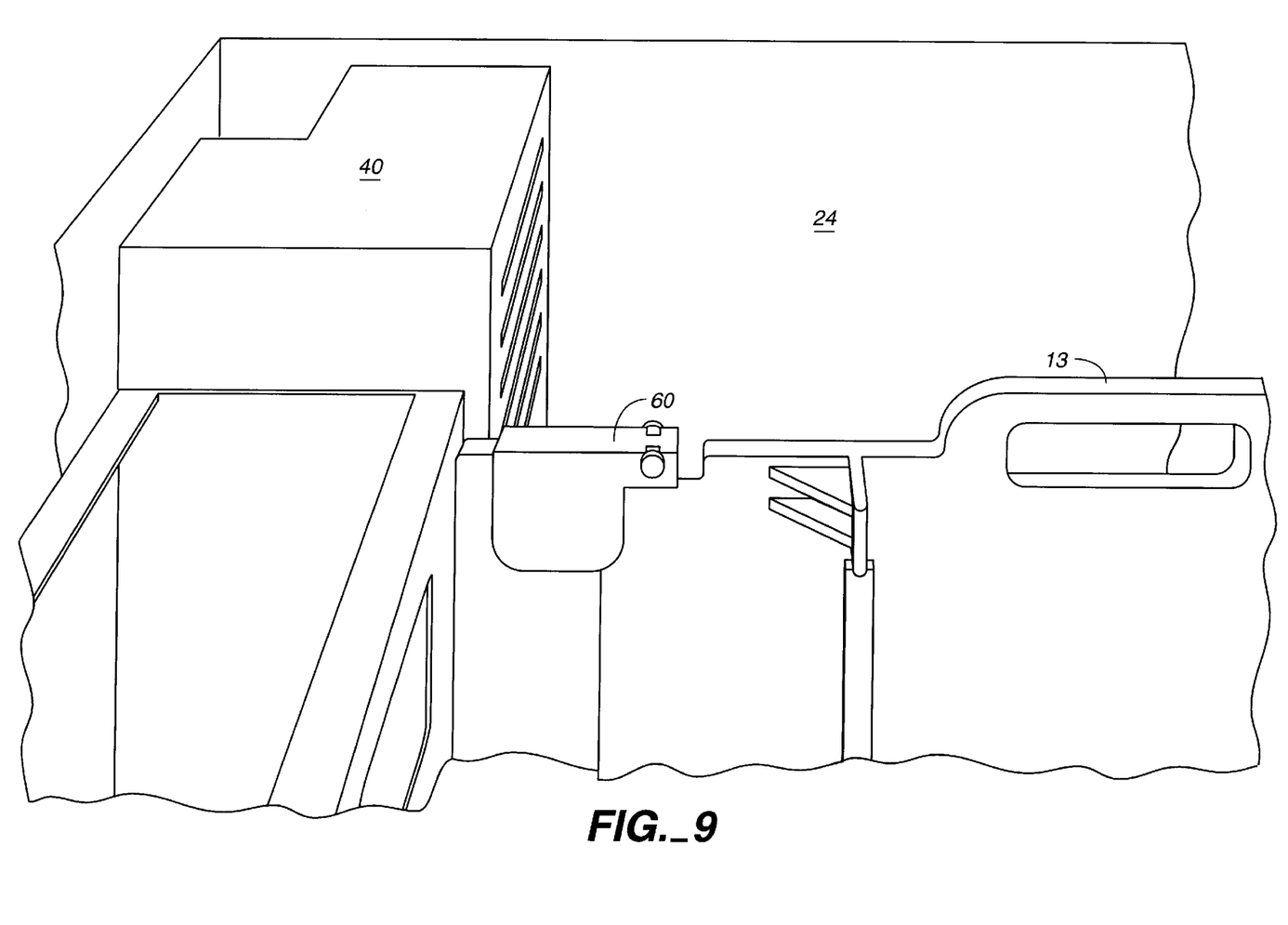

FIG. 8 shows swing clip 60 in an up, released position. When shroud 10 is installed onto the motherboard, the inner edge 88 of shroud 10 butts against flange 84, which positions swing clip 60 to pivot from the position of FIG. 8 to a closed, locked position, as shown in FIG. 9. In its locked position, swing clip 60 straddles the upper edge 86 of flange 84. The purpose of flange 84 is to provide a fixed mounting component within the chassis to which the shroud can be secured. Other fixed mounting points could be employed so long as they provide for alignment of the shroud and preferably also allow for quick disconnect of the shroud.

Figure 10:
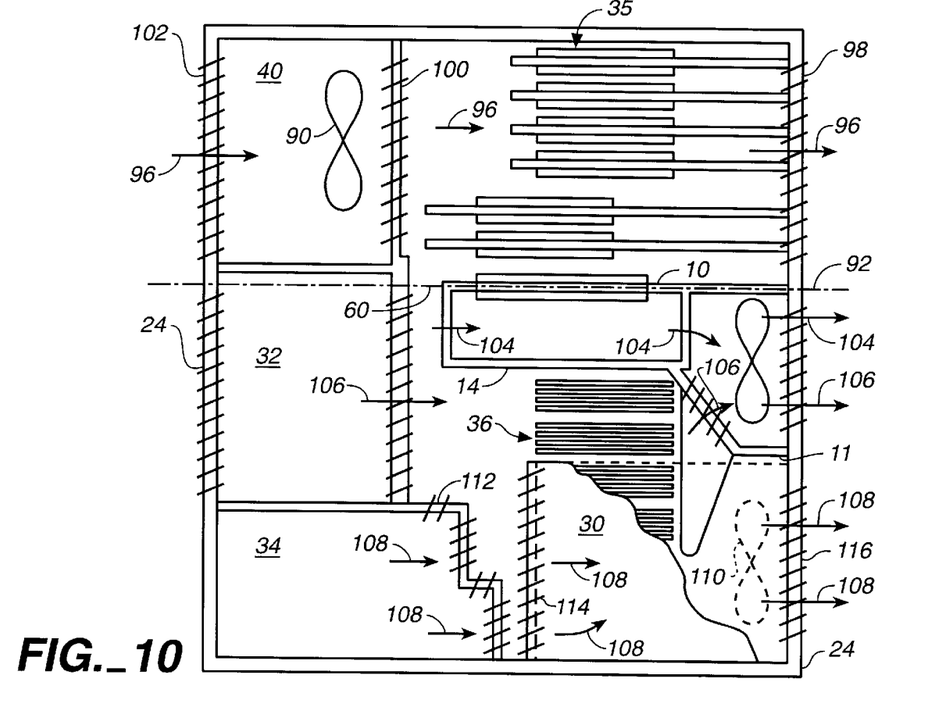
FIG. 10 is schematic top plan view of the computer assembly of FIG. 1, showing air flow patterns within the chassis.

Referring to FIG. 10, the distinct air flow patterns within chassis 24 are shown to illustrate the partition affect of the shroud 10. The auxiliary cooling fan is designated 90 and is mounted within compartment 40. Compartment 40, along with shroud 10, form a dividing partition along broken line 92, which separates the cooling air of the PCI card side of the motherboard from the cooling air of the CPU module side of the motherboard. Air flow within the PCI card side is depicted by arrows 96, which flows through vents 102, 100, across PCI card slots 35, through vents 98, to the exterior of the chassis. Air flow on the CPU side of the shroud 10 flows generally in the same direction but does not substantially mix with cooling air over the PCI cards due to the separation of shroud 10.

Arrows 104 depict the flow of cooling air across the CPU, and arrows 106 depict the flow of cooling air across DSIMMS 36, as well as other components of the motherboard. Arrows 108 depict the flow of cooling air provided by power supply fan 110. Vents 112, 114, 116 allow for front to back cooling air flow through peripheral bay 34 and power supply 30. The cooling air flow depicted by arrows 108 is not isolated from the CPU cooling air depicted by arrows 104 in the same manner as cooling air 104 is isolated from cooling air 96.

It is an important advantage of the present invention to provide for separate cooling air flows within the chassis. The cooling requirements of the PCI cards vary from that of the CPU module. And in order to achieve precise cooling efficiency, it is desirable to maximize the cooling ability of internal convective air flow patterns. Thus, a housing is provided for directing cooling air across the CPU and isolated compartments within the chassis allow for different cooling capacity for different parts of the system.

The shroud attachment of the present invention is a multipurpose component in that it positions the CPU module relative to a cooling fan, provides mounts for captive fasteners, which secure and electrically ground the motherboard, and creates a partition for isolating separate cooling air flows within the chassis. This combined, functional design of the shroud attachment simplifies the internal hardware design of the computer while enhancing cooling efficiency.

As used herein, the terms "down" and "up" refer to the relative positions of the components as shown in the figures. In use, the computer shown is turned right side up, as a mini tower computer housing, and what is described as vertical, for example, then becomes horizontal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A shroud assembly for positioning a CPU relative to a cooling fan within a computer chassis, comprising
    a vented cooling fan enclosure for securing the cooling fan in position on a motherboard, the cooling fan enclosure including at least one vent for drawing air past the CPU to the exterior of the computer chassis,
    a CPU mount for positioning the CPU relative to the cooling fan, and
    a CPU housing for enclosing the CPU, the housing forming an air inlet opening and an air outlet opening, the CPU mount including means for detachably aligning the CPU housing in a manner wherein its air outlet opening aligns with the vent of the cooling fan enclosure, so that air drawn by the cooling fan flows into the air inlet of the CPU module housing, across the CPU, out the air outlet opening and into the cooling fan enclosure, to be forced out of the computer chassis.

2. The shroud of claim 1 wherein,
    the means for detachably aligning the CPU module housing include side rails for capturing side edges of the CPU module housing and maintaining the CPU module in position relative to the cooling fan.

3. The shroud of claim 1 wherein, 20 the shroud further includes an aligning clip at an end thereof opposite the cooling fan enclosure, the aligning clip adapted to engage a fixed component within the chassis and thereby stabilize said end of the shroud.

4. The shroud of claim 3 wherein,
    the aligning clip is pivotally attached proximate said end of the shroud and pivots to engage the fixed component within the chassis.

5. The shroud of claim 1 wherein,
    the shroud includes a handle portion secured to the vented enclosure and CPU mount for grabbing the shroud in order to lift the shroud, the CPU, and the fan from the computer chassis.

6. The shroud of claim 5 and further comprising,
    fasteners for securing the shroud to the motherboard and for electrically grounding the motherboard to the chassis.

7. The shroud of claim 5 and further comprising,
    fasteners for slidably releasably securing the shroud to the motherboard.

8. The shroud of claim 1 wherein,
    the shroud is adapted to be positioned within the computer chassis in a manner where the shroud creates a partition isolating different cooling air patterns.

9. The shroud of claim 8 wherein, the shroud creates a partition between cooling air for PCI cards and the CPU.

10. A computer comprising,
    a computer chassis,
    a CPU,
    a housing enclosing the CPU and including an inlet opening and an outlet opening,
    a motherboard on which the CPU is mounted,
    a cooling fan for drawing air across the CPU,
    a shroud attachment for positioning the CPU housing relative to the cooling fan, the shroud attachment including a fan enclosure for mounting the cooling fan, the enclosure including an inlet opening that aligns with the outlet opening of the CPU housing, so that air drawn across the CPU enters the fan enclosure and is vented to the exterior of the chassis.

11. The computer of claim 10 wherein,
    the computer includes an auxiliary fan for cooling different electrical components of the computer, and wherein the shroud is dimensioned to create a partition within the chassis to isolate cooling air flows of the first cooling fan and the auxiliary fan.

12. The computer of claim 11 wherein,
    the auxiliary fan is housed in a compartment, which along with the shroud, divides the interior of the chassis into two separate cooling areas.

13. The computer of claim 10 wherein, the shroud includes fasteners for grounding the motherboard to the chassis.

14. The computer of claim 10 wherein, the fasteners also secure the motherboard to the chassis.

15. The computer of claim 10 wherein, the shroud includes an aligning clip for aligning said end of the shroud to position the CPU relative to the cooling fan.

16. The computer of claim 15 wherein, the aligning clip comprises a swing clip that is pivotally secured to the shroud and clips onto a fixed component within the chassis.

17. The computer of claim 16 wherein, the fixed component comprises a flange extension mounted at one end of the shroud.

\* \* \* \* \*

UNITED STATES PATENT AND TRADEMARK OFFICE
CERTIFICATE OF CORRECTION

PATENT NO. : 5,852,547

DATED : December 22, 1998

INVENTOR(S) : Ken Kitlas et al.

It is certified that error appears in the above-indentified patent and that said Letters Patent is hereby corrected as shown below:

Column 1, line 19, after "further and" and before "and more" delete "fuller" and insert therefor --further--; and Column 6, line 15, after "wherein," and before "the shroud" delete "20".

Signed and Sealed this

Fourth Day of May, 1999

Attest:

Q. TODD DICKINSON

Attesting Officer

Acting Commissioner of Patents and Trademarks